United States Patent [19]
Haendle et al.

[11] Patent Number: 5,436,952
[45] Date of Patent: Jul. 25, 1995

[54] TELERECORDING SYSTEM FOR X-RAY IMAGES HAVING A SEMICONDUCTOR IMAGE CONVERTER

[75] Inventors: Joerg Haendle; Heinz Horbaschek, both of Erlangen, Germany

[73] Assignee: Siemens Aktiengesellschaft, Munich, Germany

[21] Appl. No.: 145,089

[22] Filed: Nov. 3, 1993

[30] Foreign Application Priority Data

Jan. 14, 1993 [DE] Germany ............ 42 00 828.3

[51] Int. Cl.⁶ ............................................. H05G 1/64
[52] U.S. Cl. ................................ 378/98.7; 378/98.8; 378/98.12
[58] Field of Search .................. 378/98.12, 98.8, 98.7

[56] References Cited

U.S. PATENT DOCUMENTS 4,549,209 10/1985 Grady et al. ..................... 378/98.3

FOREIGN PATENT DOCUMENTS 2600962 7/1976 Germany .
3315882 11/1984 Germany .
3922451 1/1991 Germany .

*Primary Examiner*—Craig E. Church
*Attorney, Agent, or Firm*—Hill, Steadman & Simpson

[57] ABSTRACT

A telerecording system for producing x-ray images, having an x-ray image intensifier video chain which includes a semiconductor image converter, has a detector which recognizes blooming in the semiconductor image converter and which given blooming, causes at least two x-ray images of different brightness to be acquired by the semiconductor image converter. One of the images is exposed attenuated in comparison to the other so that no blooming ensues. Image signals from the two x-ray images are then superimposed in a mixer unit and the resulting image is displayed.

15 Claims, 3 Drawing Sheets

TELERECORDING SYSTEM FOR X-RAY IMAGES HAVING A SEMICONDUCTOR IMAGE CONVERTER

BACKGROUND OF THE INVENTION

1. Field of the Invention

The present invention is directed to a telerecording system for producing x-ray images having an x-ray image intensifier video chain which includes a semiconductor image converter.

2. Description of the Prior Art

Due to the exponential absorption which occurs in x-ray images produced by x-ray diagnostics installations of the above type, high differences in intensity are always present, i.e. the dynamics (contrast ranges) of the x-ray image are extremely high.

In semiconductor image converters, particularly CCD sensors, the amplifier noise is uniformly superimposed on all signal values, thus it has the greatest disturbing effect given low signal values, i.e. in the dark portions of the image. In order to boost these dark portions of the image, the optical modulation of the semiconductor image converter can be raised, however, the bright sections of the image would then move into the overmodulation or blooming region because of the linear characteristic of the semiconductor image converter, so that important information would be obscured. Neighboring dark regions of the image, moreover, also become deteriorated due to blooming in the x-ray image.

The limitation of the range of modulation given CCD converters is established by the barrier effect. An effective barrier for the charge carriers relative to the neighboring elements is no longer present when a defined charge amount per image element in the CCD converter is exceeded and the charge therefore flows over the previously-existing (blooming). This blooming can be so pronounced that large sections of the image become unusable dependent on the CCD principle employed. Modern CCD sensors therefore include so-called anti-blooming devices. These are composed, for example, of diverting or bypass diodes respectively allocated to every picture element which divert excessive charges before the blooming effect occurs. The common terminal of all anti-blooming diodes is connected, for example to the substrate and is available as a separate electrical terminal. An electrical "blooming" is thereby in fact prevented; the image locations, however, continue to be too bright and contain no information. Both a mechanical as well as an electrical darkening lead to a poorer signal-to-noise ratio. Even if control of the semiconductor image converter sensitivity with a shutter function is undertaken, a loss of x-ray quanta still occurs since an integration of charges on the basis of acquired light only ensues in a part of the exposure time.

SUMMARY OF THE INVENTION

It is an object of the present invention to provide a telerecording system, of the type having a video chain including a semiconductor or image converter which produces x-ray images having large dynamics in the image brightness without loss in the quantum statistics.

This object is achieved in a telerecording system constructed in accordance with the principles of the present invention, having a detector for detecting blooming of the image converter. This detector is fashioned such that, given blooming, at least two x-ray images of different brightness are acquired by the semiconductor image converter, one of these images being exposed attenuated (reduced brightness) in comparison to the other such that no blooming ensues. Image signals from the two x-ray images are then superimposed in a mixer unit. An x-ray image having high dynamics is thereby achieved and is presented on the playback means, whereby the dark image regions are present from the "bloomed" image and the bright image regions are present from the image which was reduced in brightness.

A video camera having a semiconductor image converter provided with a control circuit for the shutter function can be advantageously operated for fluoroscopy if the detector is connected to the control circuit and controls the shutter function thereof such that x-ray images having integration times of different length are produced. The shutter function is triggered at every $n^{th}$ x-ray image, for example at every tenth x-ray image, ($n=10$) and the $n^{th}$ x-ray image can be read into an image store.

As an alternative, the detector can be fashioned such that two successive x-ray images having different radiation intensity are produced, whereby either the hardness of the radiation or the duration of the irradiation are different.

An optimum acquisition without intermediate storage can ensue when two CCD sensors are employed as the semiconductor image converter to which the x-ray images are supplied in common via a light distributor. The quantities of light supplied to the CCD sensors differ such that the less-exposed CCD sensor exhibits no bloomed image regions.

It has proven expedient for the detector to include a threshold circuit that recognizes the overexposed regions in the normal x-ray image and replaces these image regions by the corresponding regions of the attenuated x-ray images. In this embodiment the mixing stage preferably includes a circuit that effects an additive or a chromatic superimposition of the two different exposures, whereby a different color is allocated in the chromatic illustration to the bloomed image regions than is allocated to the image regions that are not bloomed.

DESCRIPTION OF THE PREFERRED EMBODIMENTS

Figure 1:
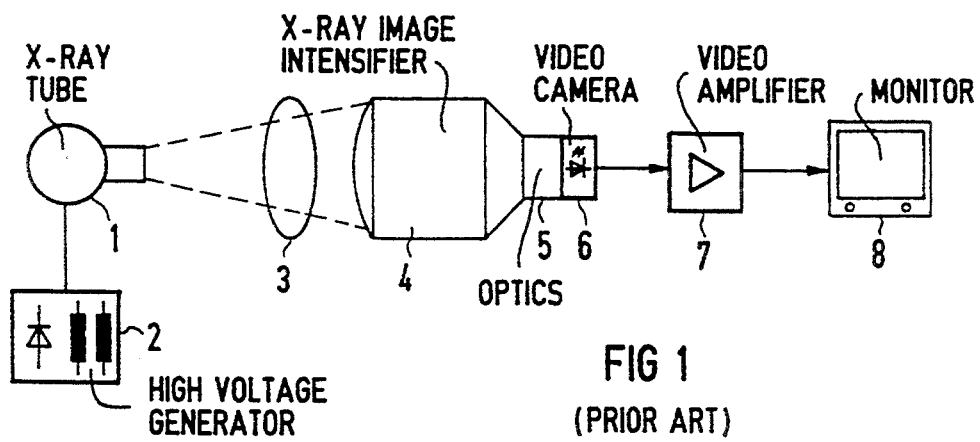
FIG. 1 is a schematic illustration an x-ray diagnostics installation of the type known in prior art.

FIG. 1 shows a conventional x-ray diagnostics system having an x-ray tube 1 that is driven by a high-voltage generator 2 so as to emit a ray beam that penetrates a patient 3 and casts a radiation image on the input luminescent screen of an x-ray image intensifier 4. The x-ray image intensifier 4 converts the radiation image into a visible image on its output luminescent screen. Optics 5 are coupled to the x-ray image intensifier 4. Due to the optics 5, the output image of the x-ray image intensifier 4 is cast onto a video camera 6 that, for example, can be a semiconductor image converter, for example a CCD sensor. The output signal of the video camera 6 is amplified in a video amplifier 7 and is reproduced on a monitor 8.

Figure 2:
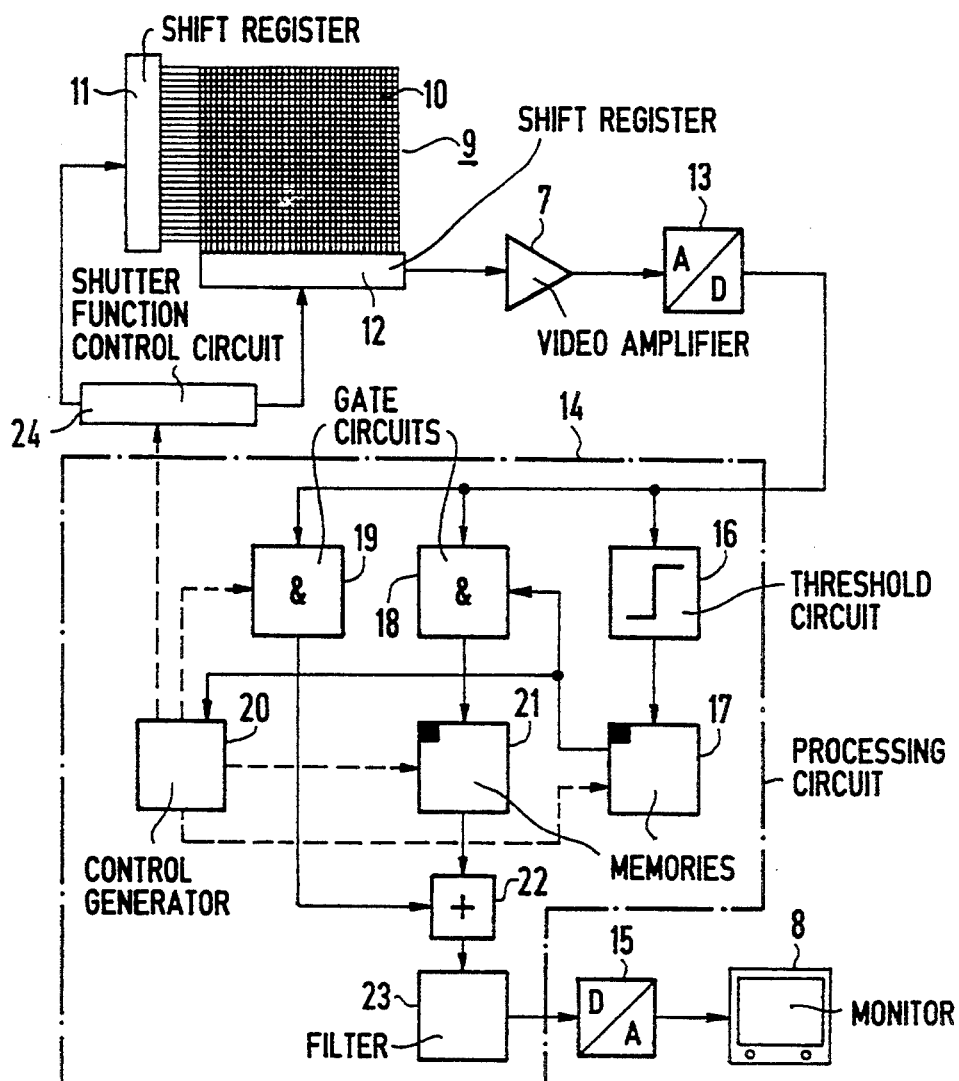
FIG. 2 is a block diagram of a video chain of the invention.

FIG. 2 shows the video camera 6 of the invention, provided with a semiconductor image converter 9. This semiconductor image converter 9 has pixels 10 which are arranged matrix-like and which serve the purpose of a pixel-by-pixel acquisition of the x-ray image. Using a read-out circuit formed by shift registers 11 and 12, the individual pixels 10 are scanned (sampled), and their output signals are supplied via the video amplifier 7 to an analog-to-digital converter 13. The digital output signal of the A/D converter 13, as described below, is operated on in a processing circuit 14, and the resulting signal is converted into an analog signal by a digital-to-analog converter and is reproduced on the monitor 8.

The read-out circuit formed by shift registers 11 and 12 samples the individual pixels 10 and conducts the output signal to the processing circuit 14, which serves as a detector for the blooming of the x-ray image. For this purpose, the processing circuit 14 includes an input stage having a threshold circuit 16 that is connected to a memory 17 for acquiring and storing addresses of the bloomed image regions. The digital output signal is also supplied to two gate circuits 18 and 19; the control input of the first gate circuit 18 being directly connected to the memory 17 and the control input of the second gate circuit 19 being connected via a control generator 20 to the memory 17 for the addresses of the bloomed image regions. The control generator 20 is also connected to the clock input of an image memory 21 for switching into the write/read mode. The input of the image memory 21 is supplied with the output signal of the first gate circuit 18. An addition unit 22 that acts as mixing unit is connected to the image memory 21 and to the second gate circuit 19. The addition unit 22 is connected to a filter circuit 23 for topical and chronological filtering. The output of the filter circuit 23 forms the output of the processing circuit 14 and is connected to the D/A converter 15 for playing the video signal back on the monitor 8. The semiconductor image converter has the electronic equivalent of a "shutter speed," which is determined by the integration time which is set by the operation of the shift registers 11 and 12. A control circuit 24 for the shutter function (i.e., controlling the "shutter speed") of the semiconductor image converter 9 is also connected to the control generator 20.

When blooming occurs in the video signal of an x-ray image supplied to the processing circuit 14, i.e. when one or more pixels 10 contain a charge representing a video signal that is higher than a threshold perceived by the threshold unit 16, then the addresses of these pixels, and thus the position of these bloomed image regions are stored in the memory 17, controlled by the threshold unit 16. Given the occurrence of the blooming, the control circuit 24 for the shutter function is operated by the control generator 20 to set the integration time such that an x-ray image is produced wherein none of the pixels are bloomed. This x-ray image is read into the image memory 21.

The current x-ray images having the bloomed image regions are supplied via the gate circuit 19, whereby the amplitude values of the bloomed pixels whose pixel addresses are deposited in the memory 17 are suppressed. These regions, however, are selected with the gate circuit 18 when the pixels of the bloomed regions are read into the image memory 21 with reduced brightness. Only those regions that are bloomed in the normal image, and are to be replaced are thus stored in the image memory 21. This ensues via the addition unit 22 wherein the video signals of the non-bloomed image regions of the current x-ray images from the gate circuit 19 and the video signals of the bloomed image regions of the stored x-ray image are mixed.

Figure 3:
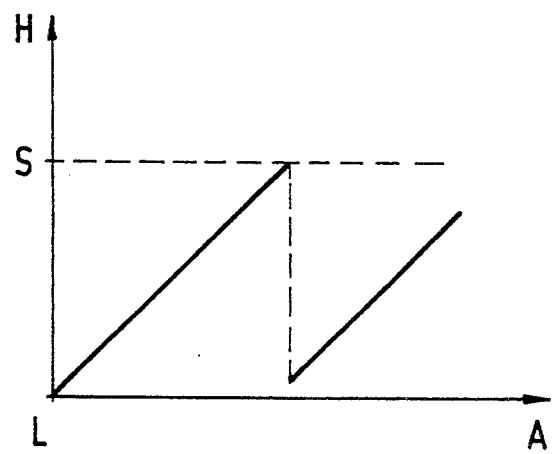
FIG. 3 is a diagram for explaining the function of the video chain of the invention.

The characteristic of such a telerecording means is reproduced in FIG. 3. The characteristic is linear up to a threshold S in the bottom, dark image region. Beginning from this point, all brighter pixels are suppressed, with the missing pixels are replaced by the stored pixels registered with lower brightness. This is represented in the second part of the characteristic that, displaced parallelly downward, again rises linearly.

During the transillumination, the processing circuit 14, functioning as a blooming detector, recognizes overmodulation of the semiconductor image converter 9 if it occurs. As a result of the control generator 20, the video signal of every $n^{th}$ x-ray image, for example of every tenth x-ray image, is stored in the image memory 21 and is superimposed with the video signal of the other nine x-ray images in the addition unit 22.

Such image selection, however, is not necessary, so that the entire memory content of the memory 21 contributes to the current video image. As may be seen from FIG. 3, however, this makes little difference since the signal is correspondingly small.

For radiography (as opposed to fluoroscopy), two exposures with different radiation intensity of the radiation or different exposure time given the same intensity can be produced by adjustment in a known manner of the operating voltages supplied by the high voltage generator 2. The first exposure with high intensity has bloomings given an extremely transparent subject field region. The second exposure following in the shortest possible time interval thereafter is produced with lower intensity without blooming of the semiconductor image converter 9. The pixels having blooming are again recognized by the detector, i.e., the threshold unit 16 with memory 17 and gate circuits 18 and 19, and are replaced by the values of the pixels 10 of the second exposure. The control generator 20 is thereby connected to the high-voltage generator 2 for controlling either the hardness of the radiation or the duration of the exposure.

Figure 4:
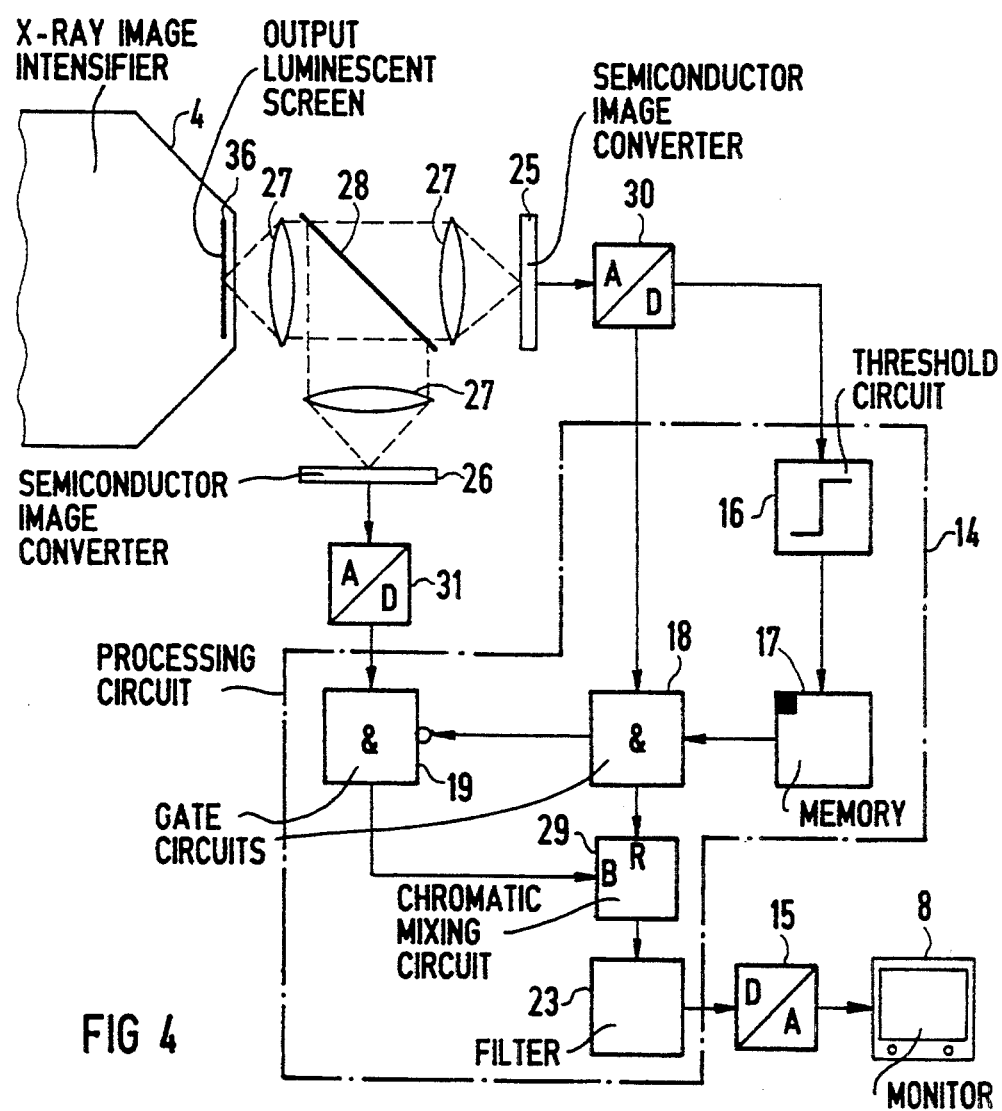
FIG. 4 is a block diagram of another embodiment of a video chain of the invention.

FIG. 4 shows another embodiment of a video chain of the invention, wherein two semiconductor image converters 25 and 26 are coupled by triple optics 27 having a light distributor 28, for example a partially reflective mirror, to the output luminescent screen 36 of the x-ray image intensifier 4. The two semiconductor image converters 25 and 26 are connected to the processing circuit 14. The first semiconductor image converter 25 is connected via a first A/D converter 30 to the threshold unit 16 and to the first gate circuit 18, whereas the second semiconductor image converter 26 is connected via a second A/D converter 31 to the second gate circuit 19. Either the addition unit 22 for black-white superimposition of the two x-ray images or, as shown, a circuit 29 for chromatic mixing can be connected to the two gate circuits 18 and 19. For example, the output signal of the first gate circuit 18 can be converted into a red image and the output signal of the second gate circuit 19 can be converted into a blue image. The circuit 29 is again connected via the filter circuit 23 and via the D/A converter 15 to the monitor 8 (which must be a color monitor in this case). The two different ranges of dynamics can be unambiguously recognized on the basis of the chromatic discrimination.

By employing two semiconductor image converters 25 and 26, for example CCD sensors, both are simultaneously illuminated via the light distributor 28, whereby the quantities of light supplied to the CCD converters differ greatly, for example, in the ratio of 1:10. The more weakly illuminated, second semiconductor image converter 26 thus has no overmodulated image regions. Due to the threshold unit 16, the position of the overmodulated pixels 10 is again recognized and is deposited in the memory 17 that drives both gate circuits 18 and 19 such that the second gate circuit 19 is supplied with the inverted signal, so that only one of the two gate circuits 18 and 19 is conductive at a time.

Figure 5:
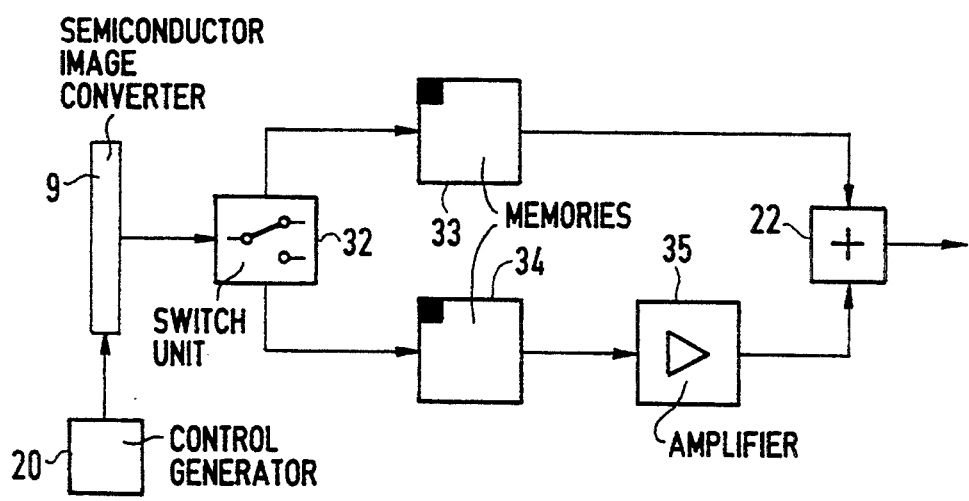
FIG. 5 is a block diagram of another embodiment of a processing circuit of the invention.
Figure 6:
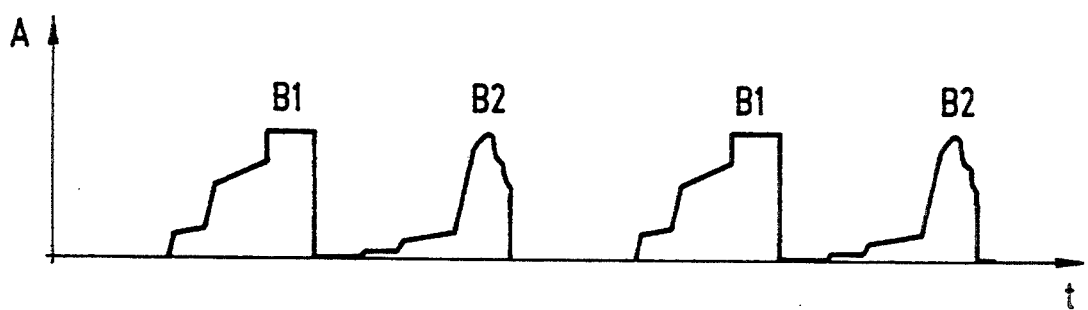
FIG. 6 shows the video signal of one semiconductor image converter in the embodiment of FIG. 5.

It is possible given some types of semiconductor image converters to control the output signal via the light intensity. Given continuous transillumination (fluoroscopy), alternating longer and shorter integration times are thus employed, resulting in high signals having good modulation in the dark image regions and low signals without overmodulation being produced in alternation. These images can be simply added when the low signal is previously set to the same level values as the high signal. No losses in signal-to-noise ratio occur due to the subsequent addition. FIG. 5 shows such a processing circuit. The output signals of the semiconductor image converter 9 which, controlled by the control generator 20 is driven in alternation with two different integration times, are supplied in alternation to two image memories 33 and 34 via a switch unit 32. The first image memory 33 is directly connected to the addition unit 22 and the second image memory 34 is connected to the addition unit 22 via an amplifier 35. The video signal of the semiconductor image converter 9 is shown in FIG. 6, wherein B1 indicates the amplitude A of the video signal of the overmodulated x-ray image and B2 indicates the amplitude A of the video signal of the more weakly exposed x-ray image. Due to the corresponding amplification of the video signal B2 in the amplifier 35 and the superimposition in the addition unit 22, an image signal is obtained that reproduces the overmodulated image regions as well as the darker image regions on the monitor 8 with full dynamics.

Although modifications and changes may be suggested by those skilled in the art, it is the intention of the inventors to embody within the patent warranted hereon all changes and modifications as reasonably and properly come within the scope of their contribution to the art.

We claim as our invention:

1. A telerecording system for producing x-ray images comprising:
    an x-ray image intensifier video means for converting a radiation image into a video image, and including a single semiconductor image converter which produces a series of converter images;
    detector means for controlling said single semiconductor image converter by identifying the presence of blooming in said converter images and, in the presence of blooming, for causing a first converter image in said series containing blooming to be acquired by said single semiconductor image converter and for subsequently causing a second converter image in said series to be acquired by said single semiconductor image converter which is exposed attenuated in comparison to said first image so that no blooming is present in said second converter image;
    memory means for storing said first converter image before acquisition of said second converter image;
    mixing means for superimposing said first converter image stored in said memory means and said second converter image to produce an image free of blooming; and
    means for displaying said image free of blooming.

2. A telerecording system as claimed in claim 1 wherein said single semiconductor image converter has a variable shutter speed associated therewith, and said telerecording system further comprising:
    first control means for setting a shutter speed for said single semiconductor image converter; and
    second control means, in said detector means, connected to said first control means for controlling the shutter speed of said single semiconductor image converter by producing a converter image with an integration time corresponding to said shutter speed set by said control means.

3. A telerecording system as claimed in claim 2 wherein said first control means comprises means for controlling said second control means for causing said production of said image with an integration time corresponding to said shutter speed at each $n^{th}$ converter image, and wherein said telerecording system further comprises memory means for storing each $n^{th}$ converter image.

4. A telerecording system as claimed in claim 3 wherein said first control means comprises means for causing production of said converter image with an integration time corresponding to said shutter speed at each tenth converter image.

5. A telerecording system as claimed in claim 1 further comprising means operated by said detector means for producing successive x-ray images with different radiation intensities.

6. A telerecording system as claimed in claim 1 wherein said means for displaying comprises a color monitor, and wherein said mixing means comprises means for chromatically superimposing said first and second converter images with any image regions in which overmodulating due to said blooming occurs having a different color allocated thereto than for non-overmodulated image regions.

7. A telerecording system as claimed in claim 1 wherein said detector means comprises threshold circuit means for identifying the location of overexposed regions in said first converter image causing said blooming; and
    means for replacing said overexposed regions with a corresponding region of said attenuated converter image.

8. A telerecording system as claimed in claim 1 wherein said mixing means comprises means for additively superimposing said first and second converter images.

9. A telerecording method for producing x-ray images comprising the steps of:
    converting a radiation image into a video image using a single semiconductor image converter which produces a series of converter images;
    identifying the presence of blooming in said converter images and, in the presence of blooming causing a first converter image in said series containing blooming to be acquired by said single semiconductor image converter and for subsequently causing a second converter image in said series to be acquired by said single semiconductor image converter which is exposed attenuated in comparison to said first image so that no blooming is present in said second converter image;

storing said first converter image;

superimposing said first converter image which was stored and sale second converter image to produce an image free of blooming; and displaying said image free of blooming.

10. A telerecording method as claimed in claim 9 wherein the step of superimposing said first and second converter images is further defined by chromatically superimposing said first and second converter images with any image regions in which overmodulating due to said blooming occurs having a different color allocated thereto than for non-overmodulated image regions.

11. A telerecording method as claimed in claim 9 comprising the additional steps of:

operating said single semiconductor image converter at a shutter speed; and controlling the shutter speed of said single semiconductor image converter to produce a converter image having an integration time corresponding to said shutter speed.

12. A telerecording method as claimed in claim 11 wherein the step of controlling said shutter speed is further defined by causing the production of said converter image having an integration time corresponding to said shutter speed at each $n^{th}$ converter image, and storing each $n^{th}$ converter image.

13. A telerecording method as claimed in claim 12 wherein the step of controlling said shutter speed is further defined by causing the production of said converter image having an integration time corresponding to said shutter speed at each tenth converter image.

14. A telerecording method as claimed in claim 9 wherein the step of superimposing said first and second converter images is further defined by additively superimposing said first and second converter images.

15. A telerecording method as claimed in claim 9 comprising the additional steps of:

identifying locations of overexposed regions in said first image causing said blooming; and replacing said overexposed regions with a corresponding region of said attenuated converter image.

* * * * *